(12) United States Patent
Diggins et al.

(10) Patent No.: US 10,728,511 B2
(45) Date of Patent: Jul. 28, 2020

(54) VIDEO PROCESSING METHOD AND APPARATUS FOR USE WITH A SEQUENCE OF STEREOSCOPIC IMAGES

(71) Applicant: Snell Advanced Media Limited, Reading, Berkshire (GB)

(72) Inventors: Jonathan Diggins, Lovedean (GB); Michael James Knee, Petersfield (GB)

(73) Assignee: GRASS VALLEY LIMITED, Newbury, Berkshire (GB)

( * ) Notice: Subject to any disclaimer, the term of this patent is extended or adjusted under 35 U.S.C. 154(b) by 0 days.

(21) Appl. No.: 16/215,421

(22) Filed: Dec. 10, 2018

(65) Prior Publication Data

US 2019/0124315 A1 Apr. 25, 2019

Related U.S. Application Data

(63) Continuation of application No. 14/989,568, filed on Jan. 6, 2016, now Pat. No. 10,154,240, which is a continuation of application No. 13/469,189, filed on May 11, 2012, now Pat. No. 9,264,688.

(30) Foreign Application Priority Data

May 13, 2011 (GB) .................................. 1108037.1

(51) Int. Cl.
*H04N 13/106* (2018.01)
*H04N 13/111* (2018.01)
*H04N 13/139* (2018.01)
*H04N 13/161* (2018.01)
*H04N 13/194* (2018.01)
(Continued)

(52) U.S. Cl.
CPC ......... *H04N 13/106* (2018.05); *H04N 13/111* (2018.05); *H04N 13/139* (2018.05); *H04N 13/161* (2018.05); *H04N 13/194* (2018.05); *H04N 13/211* (2018.05); *H04N 2013/0074* (2013.01); *H04N 2013/0081* (2013.01)

(58) Field of Classification Search
None
See application file for complete search history.

(56) References Cited

U.S. PATENT DOCUMENTS

| 8,526,716 B2 | 9/2013 | Knee |
| 8,717,422 B2 | 5/2014 | Hewes et al. |
| 2003/0103136 A1 | 6/2003 | Stanton |

(Continued)

FOREIGN PATENT DOCUMENTS

| GB | 2489202 | 9/2012 |
| WO | 2000/039998 | 7/2000 |
| WO | 2009/104022 | 8/2009 |

OTHER PUBLICATIONS

Search Report dated Jul. 26, 2011 from GB Application No. 1108037.1 dated Jul. 27, 2011; 1 pg.

*Primary Examiner* — Rebecca A Volentine
(74) *Attorney, Agent, or Firm* — Arent Fox LLP

(57) ABSTRACT

To generate a warning that a stereoscopic image sequence has been synthesised from a 2D image sequence, a video processor correlates left-eye image data and right-eye image data to identify any sustained temporal offset between the left-eye and right-eye image data. A measure of sustained correlation between a measured spatial distribution of horizontal disparity and a spatial model can also be used to generate the warning.

21 Claims, 2 Drawing Sheets

(51) Int. Cl.
*H04N 13/211* (2018.01)
*H04N 13/00* (2018.01)

(56) References Cited

U.S. PATENT DOCUMENTS

| | | | |
|---|---|---|---|
| 2004/0057612 A1* | 3/2004 | Tabata | H04N 13/261 |
| | | | 382/154 |
| 2004/0208357 A1* | 10/2004 | Tokuhashi | G06K 9/209 |
| | | | 382/154 |
| 2006/0036383 A1 | 2/2006 | Clare et al. | |
| 2006/0279750 A1 | 12/2006 | Ha | |
| 2007/0139612 A1* | 6/2007 | Butler-Smith | H04N 13/271 |
| | | | 351/201 |
| 2009/0195640 A1 | 8/2009 | Kim et al. | |
| 2010/0110163 A1 | 5/2010 | Bruls et al. | |
| 2010/0309286 A1 | 12/2010 | Chen et al. | |
| 2011/0023066 A1 | 1/2011 | Jang et al. | |
| 2011/0032329 A1 | 2/2011 | Bauza et al. | |
| 2011/0043691 A1* | 2/2011 | Guitteny | G11B 27/10 |
| | | | 348/500 |
| 2011/0164110 A1 | 7/2011 | Fortin et al. | |
| 2011/0285814 A1 | 11/2011 | Hsiao | |
| 2011/0285818 A1 | 11/2011 | Park et al. | |
| 2011/0292177 A1 | 12/2011 | Sakurai et al. | |
| 2011/0304693 A1 | 12/2011 | Border et al. | |
| 2012/0014456 A1 | 1/2012 | Martinez Bauza et al. | |
| 2012/0068996 A1* | 3/2012 | Berestov | G06T 15/005 |
| | | | 345/419 |
| 2012/0069144 A1* | 3/2012 | Li | H04N 13/189 |
| | | | 348/43 |
| 2013/0033570 A1 | 2/2013 | Shand et al. | |

\* cited by examiner

VIDEO PROCESSING METHOD AND APPARATUS FOR USE WITH A SEQUENCE OF STEREOSCOPIC IMAGES

CROSS-REFERENCE TO RELATED APPLICATIONS

This application is a continuation of and claims the benefit of U.S. patent application Ser. No. 14/989,568, filed Jan. 6, 2016, which is a continuation of U.S. patent application Ser. No. 13/469,189, filed May 11, 2012, now issued as U.S. Pat. No. 9,264,688, which claims the benefit of GB Application Serial No. 1108037.1, filed May 13, 2011, the entire contents of each of which are herein incorporated by reference in their entireties.

FIELD OF INVENTION

This invention concerns the monitoring of motion-image data.

BACKGROUND OF THE INVENTION

The intense commercial interest in 'three-dimensional' or stereoscopic motion imaging—particularly television—has led to the desire to convert existing '2D' image streams to '3D'. This is because the creation of stereoscopic material is complicated and expensive and so it is difficult to obtain sufficient content to sustain a 3D broadcast service or 'channel'. There are a number of known methods for deriving left-eye and right-eye images for stereoscopic display from a common, 2D input image in such a way that a 'synthetic' 3D image is obtained. In these methods horizontal disparity (positional shift) between the left-eye and right-eye images is introduced over all or part of the image, so that binocular vision provides the illusion that the image, or image region, is either in front of or behind the plane of a stereoscopic image display.

Some conversion methods identify objects or regions of interest by suitable image segmentation techniques, and then introduce horizontal disparity between the left-eye and right-eye representations of those objects or regions. However, image segmentation is difficult, and it is also hard to determine the required disparity that gives a convincing 3D effect.

There is a simpler, and widely-used, method of creating synthetic 3D that is applicable to horizontally-moving images; this is to introduce a temporal offset between the left-eye and right-eye images. The temporal offset results in a spatial offset (i.e. a disparity) equal to the product of the motion speed, in pixels per frame period, and the temporal offset, in frame periods. For example, if the camera pans to follow a horizontally moving object, the background will move, and the followed object will not move, so that disparity will be added only to the background. Provided that the direction of the temporal offset is controlled by the direction of pan, the background will appear further away from the viewer than the followed object. If this technique is combined with the addition of a 'global' (i.e. constant over the whole image area), and/or spatially-determined (i.e. dependent on position within the image frame) disparity, then a quite realistic illusion of depth can be obtained.

Commercial broadcasters are concerned to ensure that 3D is recognised as a 'premium' service, justifying high subscription payments by viewers and high charges for associated advertising. And, public-service broadcasters want to maintain their reputations as providers of high-quality programme material. For these reasons, technical specifications for the commissioning of video material often include restrictions on the use of synthetic 3D, because of doubts about its subjective quality. There is thus a need for the detection of synthetic 3D as part of 'quality assurance' systems used by organisations that commission video content from other organisations.

SUMMARY OF THE INVENTION

The invention consists in one aspect in a method and apparatus for analysing a sequence of stereoscopic images comprising left-eye and right-eye image data where a measure of sustained temporal offset between the said left-eye and right-eye image data is used to generate a warning that the said stereoscopic image sequence has been derived from a 2D image sequence.

In an alternative embodiment a sequence of stereoscopic images comprising left-eye and right-eye image data is analysed and a measure of sustained correlation between the measured spatial distribution of horizontal disparity between the said left-eye and right-eye image data and a spatial model of the said spatial distribution is used to generate a warning that the said stereoscopic image sequence has been derived from a 2D image sequence.

Suitably, the said measure of correlation is evaluated for time-aligned left-eye and right-eye data.

In a further embodiment, a combination of sustained temporal offset and sustained correlation with a spatial disparity model is used to generate the said warning.

Advantageously, the said spatial disparity model is a linear model derived from linear regression of measured disparity values between time-aligned left-eye and right-eye data.

In a further embodiment, there is provided video processing apparatus comprising an input for receiving left-eye image data and right-eye image data from a sequence of stereoscopic images; a correlator for performing a correlation process upon said left-eye image data and right-eye image data to identify any sustained temporal offset between the said left-eye and right-eye image data; and a logic block for performing an analysis to generate a warning that the said stereoscopic image sequence has been derived from a 2D image sequence.

In a further embodiment, there is provided apparatus for analysing a sequence of stereoscopic images comprising left-eye and right-eye image data where a measure of sustained temporal offset between the said left-eye and right-eye image data is used to generate a warning that the said stereoscopic image sequence has been derived from a 2D image sequence.

In a further embodiment, there is provided apparatus for analysing a sequence of stereoscopic images comprising left-eye and right-eye image data where a measure of sustained correlation between the measured spatial distribution of horizontal disparity between the said left-eye and right-eye image data and a spatial model of the said spatial distribution is used to generate a warning that the said stereoscopic image sequence has been derived from a 2D image sequence.

BRIEF DESCRIPTION OF THE DRAWINGS

An example of the invention will now be described with reference to the drawings in which.

DETAILED DESCRIPTION OF THE INVENTION

An important feature of the invention is the detection of a spatio-temporal image offset between the left-eye and right-eye images of a stereo pair of images that is 'piecewise constant', that is to say the offset remains constant for a section of an image sequence and then changes rapidly to another constant value during another section of the image sequence. When such offsets are found, it is likely that the pair of images were not created by two cameras with horizontally-separated viewpoints (i.e. true stereoscopic image acquisition), but rather a single image has been modified and duplicated to create a synthetic stereo pair of images.

Figure 1:
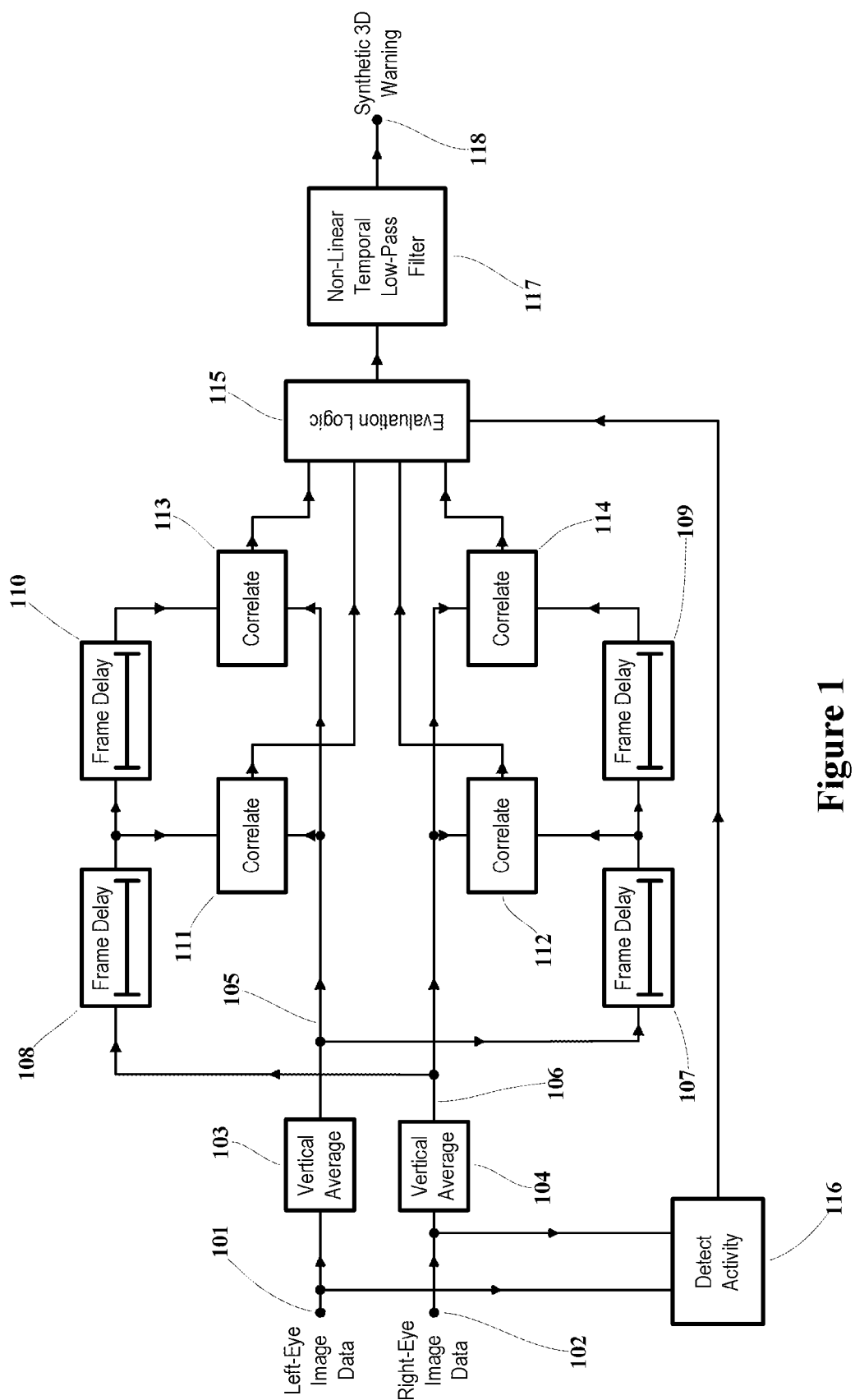
FIG. 1 shows a block diagram of a first exemplary embodiment of the invention.

FIG. 1 show an example of a system to achieve this detection. Two, co-timed video data streams (101), (102) that represent the left-eye and right-eye images respectively of a stereoscopic video sequence, are input to respective vertical averaging processes (103), (104). These each output a set of pixel values for each video frame, where each value is the average for a column of vertically-aligned pixels extending over substantially the full image height. Typically luminance values of pixels are averaged, though any other representative pixel measure can be used. The sets of values for the frames, are input to two pairs of cascaded frame delays: the left-eye data sets (105) are input to a first frame delay (107) whose output feeds a second frame delay (109); and, the right-eye data sets (106) are input to a first frame delay (108), whose output feeds a second frame delay (110).

Four identical correlation processors (111), (112), (113) and (114) compare the average data sets (5) and (6) with the respective opposite-eye, frame delayed data sets.

The correlation processor (111) compares left-eye data (105) with one-frame-delayed right-eye data from the frame delay (108).

The correlation processor (113) compares left-eye data (105) with two-frame-delayed right-eye data from the frame delay (110).

The correlation processor (112) compares right-eye data (106) with one-frame-delayed left-eye data from the frame delay (107).

The correlation processor (114) compares right-eye data (106) with two-frame-delayed left-eye data from the frame delay (109).

Each correlation processor outputs a measure of the best match between the respective undelayed data and the respective delayed data. The best match is the closest match obtained by horizontally shifting the pixel values over a search window, typically ±10% of the image width. The correlation process may use the well-known Pearson correlation method, or a simple average of inter-pixel difference values can be evaluated for a number of horizontal shift positions and the smallest average value used as the measure of match.

The outputs from the four correlation processors are passed to an evaluation logic block (115), which also receives the output of an activity detector (116). The evaluation logic block (115) determines when there is significant correlation between one- or two-frame-delayed left-eye and right-eye data, and that there is sufficient variation in pixel values over the image, as determined by the activity detector (116), to make the correlation meaningful. The evaluation logic block (115) could simply take the lowest match error, test to see if it is below a threshold value, and output it if the output of the activity detector is asserted. More complex evaluation methods are possible, for example a test to see whether one correlation is significantly better than all the others, could be included.

The activity detector (116) evaluates a measure of high spatial-frequency energy over each input image. This could be a simple average of value differences between neighbouring pixels. The two input images of the stereo pair could both be evaluated and the results combined, or only one image of the pair could be evaluated. To save processing resources it may be convenient to evaluate the activity measure for one or both of the vertically-averaged data sets (105) and (106).

The output from the evaluation logic block (115) is a measure of the likelihood that the input images are not a true stereo pair derived from different viewpoints. Because the validity of this output changes over time, and is only available when picture activity is detected, it is helpful to filter it temporally in the temporal low-pass filter (117). This can be a simple running average recursive filter, or may include non-linearity, so that the characteristics of the filter are modified in dependence upon its most recent output. The effect of the filter is to reject short-duration outputs from the evaluation logic-block (115); only outputs that are sustained over several tens of frames should give rise to an indication of synthetic 3D. A sustained output does not necessarily mean that the temporal offset is constant; a sequence of non-zero offsets with a magnitude of one or two frames of either polarity that lasts for several tens of frames is a valid warning. The output from the temporal low-pass filter (117) is thus a more reliable indication of the presence of synthetic 3D than the instantaneous output from the evaluation logic block (115).

As mentioned in the introduction, temporal offset is often combined with fixed, position-dependant spatial offsets in order to create synthetic 3D. A second example of the invention will now be described that detects this technique.

Figure 2:
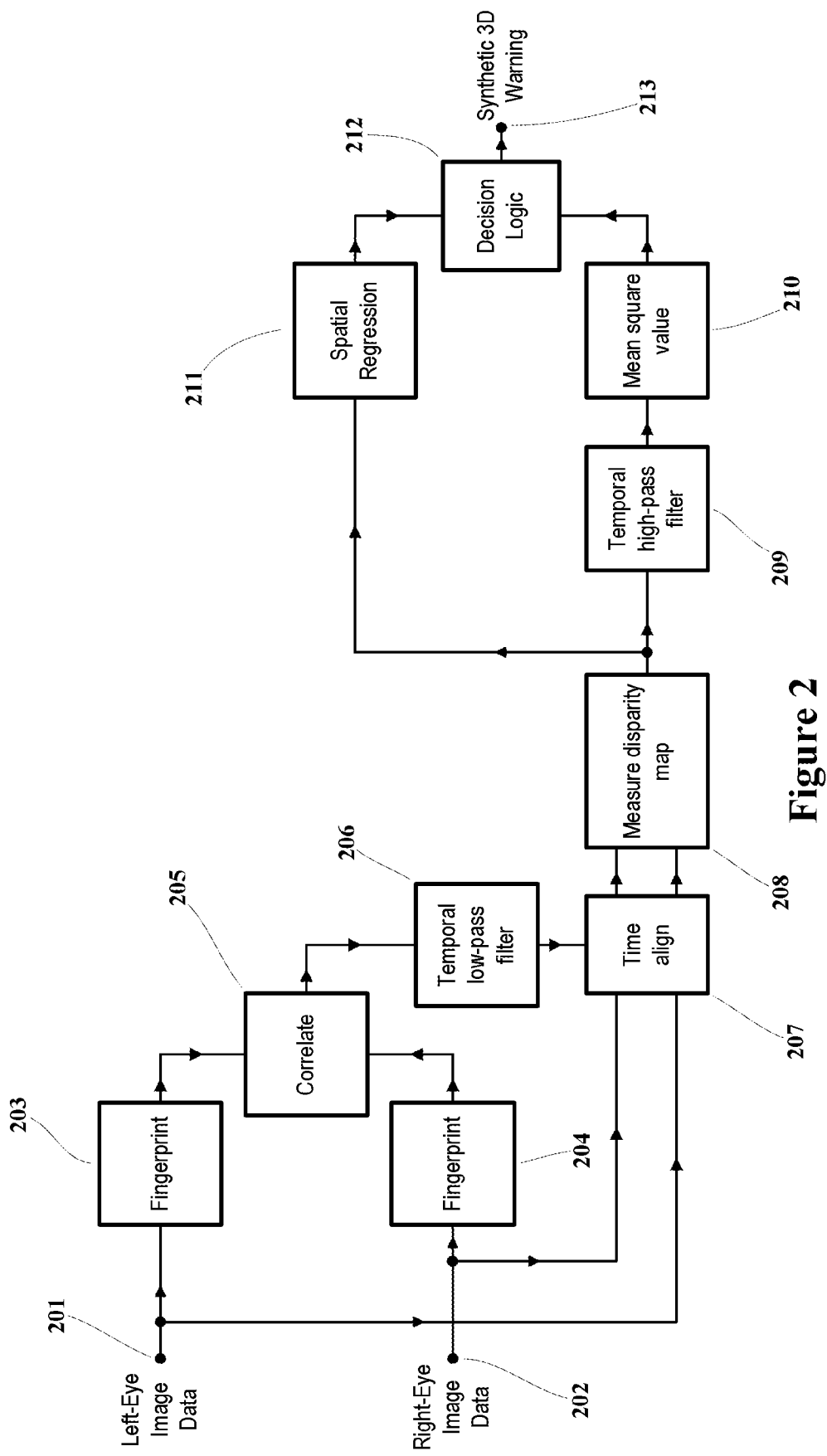
FIG. 2 shows a block diagram of a second exemplary embodiment of the invention.

Referring to FIG. 2, co-timed left-eye and right-eye video data streams are input to respective 'fingerprint' detectors (203) and (204). The object of video fingerprinting is to derive a parameter that describes a video frame sufficiently well for a copy of that frame to be identified by comparison of the respective fingerprint parameters. There are many known video fingerprinting techniques; some are described in International Patent Application WO 2009/104022 (the content of which is hereby incorporated by reference). A very simple fingerprint is the average luminance of a frame, or a set of average luminance values for a defined set of spatial regions within a frame.

The left-eye and right-eye fingerprints are input to a correlator that evaluates the temporal correlation between the two streams of fingerprints to find the temporal offset between the input video streams (201) and (202). Typically the process compares the correlation between the fingerprint stream after the application of a number of 'trial' offset values, and the offset value that gives the best match is output.

The output from the correlator (205) is temporally low pass filtered (206). This filter be nonlinear, for example it may be optimised to detect piecewise constant inputs by controlling its bandwidth according the frequency of changes in its input value. The filter output must be rounded to an integral number of video frames, and this number is used to control a time alignment block (207). This removes any temporal offset between the input data streams (201) and (202) by delaying one or other of the input streams by the number of frames indicated by the filter output.

The two, temporally-aligned data streams are input to disparity mapping block (208). This uses any known method of evaluating the horizontal disparity between spatially co-located regions in the temporally-aligned left-eye and right-eye images. For example, the method of determining the disparity value for a region described in UK patent application 1104159.7 and U.S. patent application Ser. No. 13/415,962 (the content of both of which is hereby incorporated by reference) can be used. The number of image regions for which disparity values are obtained will depend on the available processing resources; it is clearly advantageous to have a large number of regions, and to ensure that the majority of the image area is evaluated. However, image edge regions can be ignored.

The output of the disparity mapping block (208) is thus a stream of sets of disparity values, one set for each frame of the time-aligned video streams from the time alignment block (207); each set describes the spatial disparity pattern for the respective frame. These sets of disparity values are input to a temporal high-pass filter (209) that outputs sets of temporally-filtered disparity values at frame rate. The filter forms each member of each set of output values from a weighted sum of co-located disparity values from a number of adjacent frames. The simplest example, which may be suitable in many cases, is for each output value to be the difference between the current disparity for a region and the disparity for the same region in the previous frame.

The sets of temporally high-pass filtered disparity values are input to a mean square calculator (209). This forms a measure of total temporal energy of horizontal disparity for each frame. Preferably each input disparity value is squared and the mean of the sum of the squares over each video frame is output. If processing resources are scarce it may be acceptable to output the mean value of the total of the magnitudes of the disparity values for each frame.

The output of the disparity mapping block (208) is also input to a spatial regression block (211). This evaluates how easy it is to fit a simple spatial model to the pattern of disparity values. The simplest implementation is to average the disparity values vertically and perform linear regression on the set of average disparity versus horizontal position data; and, to average the disparity values horizontally and perform linear regression the set of average disparity versus horizontal position data. As is well-known, classical linear regression finds the linear model that best fits the data, and evaluates the errors from that model in a single operation. The two regression coefficients, quantifying the quality of fit of the disparity distribution of the current frame to a linear relationship with respect to horizontal position, and a linear relationship with respect to vertical position, are input to a decision logic block (212).

If the disparity distribution fits a linear model well, and there is little temporal disparity variation energy, then it is very likely that synthetic 3D is present. True stereoscopic images are likely to have temporal variations in disparity due to moving objects; and, the spatial variation of disparity is likely to be complex. The logic block (212) thus detects the condition when there is a low output from the mean square evaluation (209) and one or two near-unity outputs from the spatial regression analysis (210). When this condition is detected, a synthetic 3D warning (213) is output. The decision logic (212) can also make use of the output from the temporal low-pass filter (206) so that the combination of temporal offset with a linear model of spatial offset is recognised as strongly characterising synthetic 3D. As with the system of FIG. 1 it is important to reject short duration correlation events, and a temporal low-pass filter should be included to ensure that only sustained correlation with the disparity model gives rise to a warning.

And, also as with the system of FIG. 1, it is important to reject false warnings derived from ambiguous input data. The detection of temporal offset requires temporal activity, and the detection of disparity requires spatial activity. A control system is thus necessary to confirm this activity. Unchanging fingerprint parameters from the fingerprint blocks (203) and (204) indicate that the temporal offset cannot be determined. And, lack of high spatial frequencies prevents disparity from being determined. If it is no longer possible to measure an image characteristic that gave rise to a warning, the warning should be maintained until a valid measurement that cancels the warning is obtained.

It will be understood that that features from the two described embodiments may be combined. For example, the correlation process described in relation to FIG. 1 may be used to drive the time align unit 207 of the FIG. 2 embodiment, in place of the described correlation process using fingerprints. Similarly, a correlation process using fingerprints may be used as part of a system in which the measure of sustained temporal offset between the left-eye and right-eye image data is used to generate the warning, without consideration of spatial distribution of horizontal disparity.

The invention claimed is:

1. A quality assurance system for restricting distribution of a stereoscopic image sequence exhibiting synthetic three-dimensional (3D) image quality, the system comprising:
 an image correlator configured to determine a sustained temporal offset for a stereoscopic image sequence by comparing current image data of one of left-eye and right-eye image data of the stereoscopic image sequence with delayed image data of the other of the left-eye and right-eye data of stereoscopic image sequence;
 a synthetic 3D determiner configured to determine the stereoscopic image sequence is exhibiting synthetic 3D image quality when the sustained temporal offset is constant at a first value for a first set of images of the stereoscopic image sequence and constant at a different value for a second set of images of the stereoscopic image sequence; and
 an image distribution restrictor configured to prevent distribution of the stereoscopic image sequence when the stereoscopic image sequence is exhibiting synthetic 3D image quality,
 wherein the stereoscopic image sequence is a two-dimensional (2D) image sequence converted for three-dimensional (3D) distribution.

2. The quality assurance system according to claim 1,
 wherein the image correlator is further configured to measure a spatial distribution of horizontal disparity between the left-eye and right-eye data of the stereoscopic image sequence to determine the sustained temporal offset, and
 wherein the synthetic 3D determiner is further configured to determine the 2D image sequence is exhibiting synthetic 3D image quality based on the measured spatial distribution of horizontal disparity.

3. The quality assurance system according to claim 1, wherein the image distribution restrictor is further configured to generate an alarm to alert a user to restrict distribution of the stereoscopic image sequence when the stereoscopic image sequence is exhibiting synthetic 3D image quality.

4. The quality assurance system according to claim 1, wherein the synthetic 3D determiner is configured to compare left-eye image data with right-eye image data delayed by one image and with right-eye image data delayed by two images and to compare right-eye image data with left-eye image data delayed by one image and with left-eye image data delayed by two images.

5. The quality assurance system according to claim 1, wherein the predetermined threshold number of images of the stereoscopic image sequence comprise at least ten images.

6. The quality assurance system according to claim 1, further comprising a vertical filter configured to filter the left-eye image data and the right-eye image data prior to the image correlator determining a sustained temporal offset, wherein the vertical filter comprises a vertical averager configured to operate on columns in the left-eye image data and the right-eye image data.

7. A quality assurance system for restricting distribution of a stereoscopic image sequence exhibiting synthetic three-dimensional (3D) image quality, the system comprising:
an image correlator configured to determine a sustained temporal offset for a stereoscopic image sequence by comparing current image data of one of left-eye and right-eye image data of the stereoscopic image sequence with delayed image data of the other of the left-eye and right-eye data of stereoscopic image sequence;
a synthetic 3D determiner configured to determine the stereoscopic image sequence is exhibiting synthetic 3D image quality when the sustained temporal offset is determined for a predetermined threshold number of images of the stereoscopic image sequence; and
an image distribution restrictor configured to prevent distribution of the stereoscopic image sequence when the stereoscopic image sequence is exhibiting synthetic 3D image quality.

8. The quality assurance system according to claim 7, wherein the stereoscopic image sequence is a two-dimensional (2D) image sequence.

9. The quality assurance system according to claim 8, wherein the image correlator is further configured to measure a spatial distribution of horizontal disparity between the left-eye and right-eye data of the stereoscopic image sequence to determine the sustained temporal offset, and
wherein the synthetic 3D determiner is further configured to determine the 2D image sequence is exhibiting synthetic 3D image quality based on the measured spatial distribution of horizontal disparity.

10. The quality assurance system according to claim 7, wherein the image distribution restrictor is further configured to generate an alarm to alert a user to restrict distribution of the stereoscopic image sequence when the stereoscopic image sequence is exhibiting synthetic 3D image quality.

11. The quality assurance system according to claim 7, wherein the synthetic 3D determiner comprises a logic block configured to determine the stereoscopic image sequence is exhibiting synthetic 3D image quality when the sustained temporal offset is constant at a first value for a first set of images of the stereoscopic image sequence and constant at a different value for a second set of images of the stereoscopic image sequence.

12. The quality assurance system according to claim 7, wherein the synthetic 3D determiner is configured to compare left-eye image data with right-eye image data delayed by one image and with right-eye image data delayed by two images and to compare right-eye image data with left-eye image data delayed by one image and with left-eye image data delayed by two images.

13. The quality assurance system according to claim 7, wherein the predetermined threshold number of images of the stereoscopic image sequence comprise at least ten images.

14. The quality assurance system according to claim 7, further comprising a vertical filter configured to filter the left-eye image data and the right-eye image data prior to the image correlator determining a sustained temporal offset, wherein the vertical filter comprises a vertical averager configured to operate on columns in the left-eye image data and the right-eye image data.

15. A quality assurance system for restricting distribution of a two-dimensional (2D) image stream converted for three-dimensional (3D) distribution when the 2D image stream is experiencing synthetic 3D image quality, the system comprising:
an image correlator configured to compare a first sequence of one of left-eye image and right-eye image data of a converted 2D image stream with a second sequence of the other of the left-eye and right-eye data of the converted 2D image stream, with the first and second sequences having a time offset relative to each other, the image correlator being further configured to determine a sustained temporal offset by comparing the first and second sequences of the left-eye image and right-eye image data, respectively;
an image distribution restrictor configured to prevent distribution of the converted 2D image stream when the converted 2D image stream is experiencing synthetic 3D image quality based on a comparison by the image correlator of the first and second sequences of the left-eye image and right-eye image data, respectively; and
a synthetic 3D determiner configured to determine the converted 2D image stream is experiencing synthetic 3D image quality when the sustained temporal offset is determined for a predetermined threshold number of images of the stereoscopic image sequence.

16. The quality assurance system according to claim 15, wherein the image correlator is further configured to measure a spatial distribution of horizontal disparity between the left-eye and right-eye data of the converted 2D image stream to determine the sustained temporal offset, and
wherein the synthetic 3D determiner is further configured to determine the 2D image sequence is exhibiting synthetic 3D image quality based on the measured spatial distribution of horizontal disparity.

17. The quality assurance system according to claim 15, wherein the image distribution restrictor is further configured to generate an alarm to alert a user to restrict distribution of the converted 2D image stream when the converted 2D image stream is experiencing synthetic 3D image quality.

18. The quality assurance system according to claim 15, wherein the synthetic 3D determiner comprises a logic block configured to determine the converted 2D image stream is experiencing synthetic 3D image quality when the sustained temporal offset is constant at a first value for a first set of images of the converted 2D image stream and constant at a different value for a second set of images of the converted 2D image stream.

19. The quality assurance system according to claim 15, wherein the synthetic 3D determiner is configured to compare left-eye image data with right-eye image data delayed by one image and with right-eye image data delayed by two images and to compare right-eye image data with left-eye image data delayed by one image and with left-eye image data delayed by two images.

20. The quality assurance system according to claim 15, wherein the predetermined threshold number of images of the converted 2D image stream comprise at least ten images.

21. The quality assurance system according to claim 15, further comprising a vertical filter configured to filter the left-eye image data and the right-eye image data prior to the image correlator determining a sustained temporal offset, wherein the vertical filter comprises a vertical averager configured to operate on columns in the left-eye image data and the right-eye image data.

* * * * *